(12) United States Patent
Jania et al.

(10) Patent No.: US 10,558,949 B2
(45) Date of Patent: Feb. 11, 2020

(54) USER-CONFIGURED ALTERNATE EMAIL RENDERING

(75) Inventors: Frank L. Jania, Chapel Hill, NC (US); Andrew L. Schirmer, Andover, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 709 days.

(21) Appl. No.: 12/469,567

(22) Filed: May 20, 2009

(65) Prior Publication Data

US 2010/0299394 A1    Nov. 25, 2010

(51) Int. Cl.
*G06Q 10/10* (2012.01)

(52) U.S. Cl.
CPC .................. *G06Q 10/107* (2013.01)

(58) Field of Classification Search
CPC .............................. H04L 51/14; G06Q 10/107
USPC .................................................. 709/206, 207
See application file for complete search history.

(56) References Cited

U.S. PATENT DOCUMENTS

| | | | | |
|---|---|---|---|---|
| 4,962,532 A * | 10/1990 | Kasiraj et al. | | 726/6 |
| 5,377,354 A * | 12/1994 | Scannell et al. | | 718/103 |
| 5,627,764 A * | 5/1997 | Schutzman | | G06N 5/022 358/402 |
| 6,023,723 A * | 2/2000 | McCormick et al. | | 709/206 |
| 6,073,142 A * | 6/2000 | Geiger | | G06Q 10/107 709/204 |
| 6,167,434 A * | 12/2000 | Pang | | G06Q 10/107 709/206 |
| 6,393,464 B1 * | 5/2002 | Dieterman | | G06Q 10/107 709/206 |
| 6,453,327 B1 * | 9/2002 | Nielsen | | G06Q 10/107 709/206 |
| 6,463,463 B1 * | 10/2002 | Godfrey | | G06Q 10/107 340/7.21 |
| 6,615,241 B1 * | 9/2003 | Miller | | G06Q 10/107 707/999.1 |
| 6,650,890 B1 * | 11/2003 | Irlam | | G06Q 10/107 455/412.1 |
| 6,687,740 B1 * | 2/2004 | Gough | | G06Q 10/107 709/201 |
| 6,802,012 B1 * | 10/2004 | Smithson | | G06F 21/564 709/206 |
| 6,842,775 B1 * | 1/2005 | Chastain et al. | | 709/207 |

(Continued)

OTHER PUBLICATIONS

'tangible' 2000, in Collins English Dictionary, Collins, London, United Kingdom, viewed May 28, 2012, <from http://www.credoreference.com/entry/hcengdict/tangible>.*

(Continued)

*Primary Examiner* — Philip J Chea
*Assistant Examiner* — Wing Ma
(74) *Attorney, Agent, or Firm* — Fabian VanCott; Steven L. Nichols

(57) ABSTRACT

A method of rendering email includes receiving with a networked computing device at least one filter criterion; receiving with the networked computing device an email message; and, responsive to a determination by the networked computing device that the email message meets the at least one filter criterion, diverting the email message from delivery to an inbox and providing an immediate display of the email message in its entirety to a user.

20 Claims, 8 Drawing Sheets

(56) References Cited

U.S. PATENT DOCUMENTS

| | | | |
|---|---|---|---|
| 7,000,179 B2* | 2/2006 | Yankovich | G06Q 10/10 715/222 |
| 7,250,955 B1* | 7/2007 | Beeman | G06F 9/4443 345/592 |
| 7,308,252 B2* | 12/2007 | Rybak et al. | 455/412.1 |
| 8,290,768 B1* | 10/2012 | Nelken | G06F 9/4881 704/1 |
| 8,776,222 B2* | 7/2014 | Lu | G06Q 10/107 709/206 |
| 9,092,624 B2* | 7/2015 | Kolingivadi | G06F 21/563 |
| 9,177,264 B2* | 11/2015 | Uomini | H04L 51/12 |
| 9,699,129 B1* | 7/2017 | Nelken | H04L 51/26 |
| 2002/0087649 A1* | 7/2002 | Horvitz | 709/207 |
| 2002/0116463 A1* | 8/2002 | Hart | H04L 12/585 709/206 |
| 2002/0159575 A1* | 10/2002 | Skladman et al. | 379/93.24 |
| 2003/0018724 A1* | 1/2003 | Mathewson et al. | 709/206 |
| 2003/0023692 A1* | 1/2003 | Moroo | 709/206 |
| 2004/0039786 A1* | 2/2004 | Horvitz et al. | 709/207 |
| 2004/0061716 A1* | 4/2004 | Cheung et al. | 345/710 |
| 2004/0098462 A1* | 5/2004 | Horvitz et al. | 709/207 |
| 2004/0128359 A1* | 7/2004 | Horvitz et al. | 709/207 |
| 2004/0143636 A1* | 7/2004 | Horvitz et al. | 709/207 |
| 2004/0236839 A1* | 11/2004 | Wilson | H04L 51/24 709/207 |
| 2004/0254990 A1* | 12/2004 | Mittal | 709/206 |
| 2005/0015451 A1* | 1/2005 | Sheldon et al. | 709/206 |
| 2005/0015626 A1* | 1/2005 | Chasin | H04L 63/0245 726/4 |
| 2005/0038863 A1* | 2/2005 | Onyon et al. | 709/207 |
| 2005/0050145 A1* | 3/2005 | Lowe | H04L 29/06 709/206 |
| 2005/0091385 A1* | 4/2005 | Nordstrom | H04L 51/12 709/228 |
| 2005/0097174 A1* | 5/2005 | Daniell | G06Q 10/107 709/206 |
| 2005/0165895 A1* | 7/2005 | Rajan et al. | 709/206 |
| 2005/0223062 A1* | 10/2005 | Doan et al. | 709/206 |
| 2006/0095339 A1* | 5/2006 | Hayashi et al. | 705/26 |
| 2008/0126951 A1* | 5/2008 | Sood et al. | 715/752 |
| 2008/0301235 A1* | 12/2008 | Mankiewicz | G06Q 10/107 709/206 |
| 2009/0089381 A1* | 4/2009 | Anderson et al. | 709/206 |
| 2010/0228812 A1* | 9/2010 | Uomini | G06Q 10/00 709/203 |
| 2011/0179491 A1* | 7/2011 | Spurlock | G06F 21/554 726/24 |
| 2012/0185550 A1* | 7/2012 | Hart | H04L 12/585 709/206 |
| 2012/0191792 A1* | 7/2012 | Chebiyyam | G06Q 10/107 709/206 |
| 2013/0024935 A1* | 1/2013 | Kolingivadi | G06F 21/563 726/22 |
| 2015/0249680 A1* | 9/2015 | Gartside | H04L 63/145 726/23 |

OTHER PUBLICATIONS

'Inbox' 2000, in Collins Dictionary of Computing, Collins, London, United Kingdom, viewed May 28, 2012, <from http://www.credoreference.com/entry/hcdcomp/inbox>.*

* cited by examiner

USER-CONFIGURED ALTERNATE EMAIL RENDERING

BACKGROUND

The present specification relates to the field of email message delivery. More specifically, the present specification relates to the field of email message rendering to a user.

As a fast, reliable, and inexpensive method of transmitting messages and files, email is widely used for business and personal communication. Under a typical scenario, a user of an email client program composes an email message and indicates one or more email address to which the message will be sent. The email client program then transmits the message to an email server, which forwards the message either directly to a recipient email client (i.e., one using the same email server as the sender) or to an email server associated with the recipient email client.

Many users of email applications face a constant challenge in dealing effectively with the large quantities of email they typically receive. It is often difficult, for example, for a user to ensure that he or she is attending to the information, communications, and tasks received by email that are most important. For example, if a user's email inbox has a large number of unread email messages, it may require work for the user to sift through the inbox to identify and focus his or her efforts on the email messages that call for more immediate action.

BRIEF SUMMARY

A method of rendering email includes receiving with a networked computing device at least one user-selected filter criterion; receiving with the networked computing device an email message; and responsive to a determination by the networked computing device that the email message meets the at least one filter criterion, diverting the email message from delivery to an inbox and providing an immediate display of the email message in its entirety to a user.

A system includes a computing device configured to implement an email client and an email server in communication with the computing device through a network. The computing device is configured to divert an email message received from the email server from delivery to an inbox and immediately display the email message to a user responsive to the computing device determining that the email message meets at least one user-selected criterion for alternate email rendering.

A computer program product for email rendering includes a computer usable medium having computer usable program code embodied therewith. The computer usable program code includes computer usable program code configured to receive at least one user-selected filter criterion; computer usable program code configured to receive an email message; and computer usable program code configured to divert the email message from delivery to an inbox and immediately display the email message in its entirety to a user responsive to a determination that the email message meets the at least one user-selected filter criterion.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
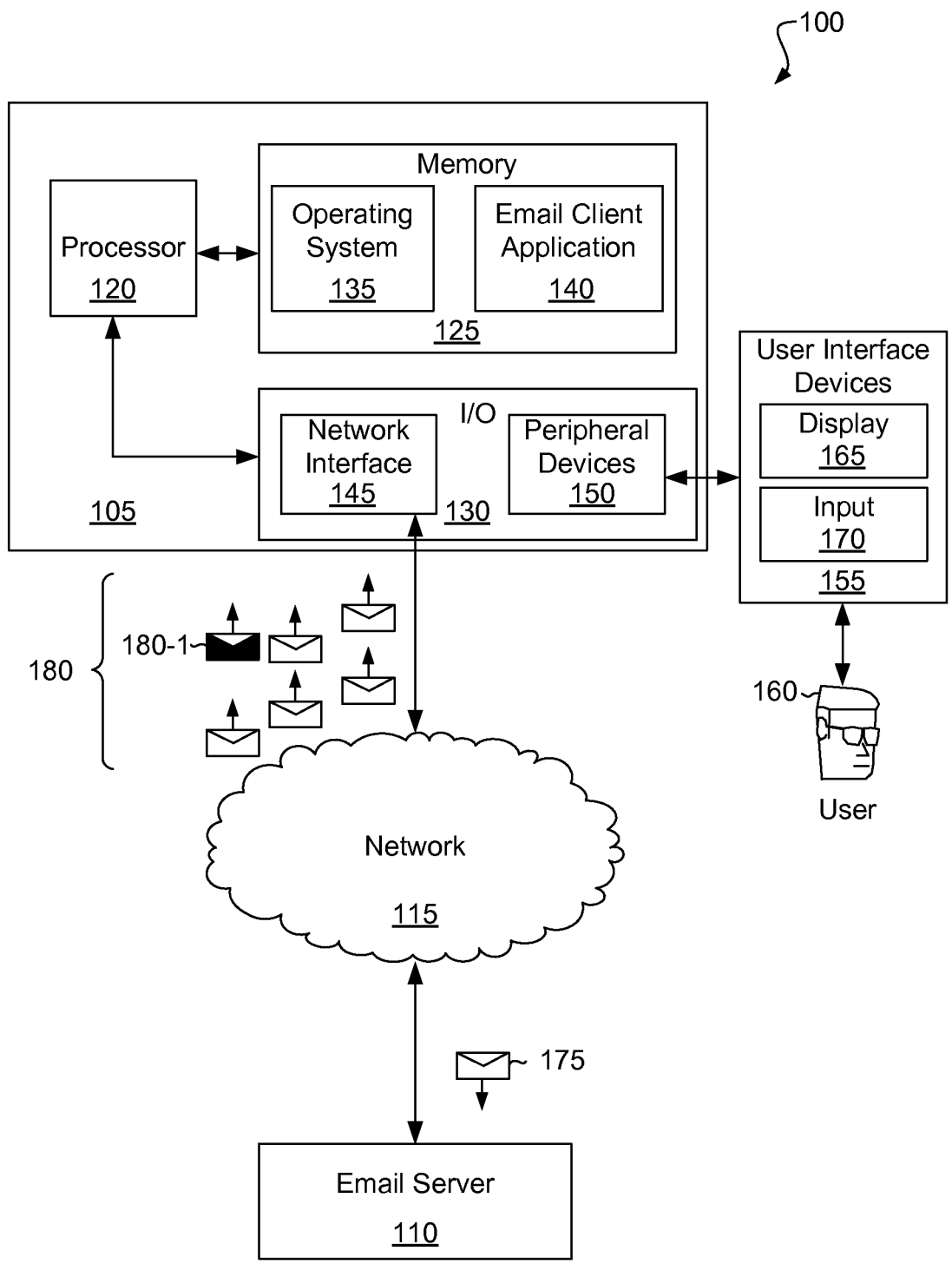
FIG. 1 is a block diagram of an illustrative system of email communication, according to one exemplary embodiment of principles described herein.

The present specification discloses methods, systems, and computer program products for alternate rendering of email messages. According to the principles disclosed herein, a user may select one or more criteria which deem a received email message important (or otherwise deserving of special treatment). Received email messages that fit the user-selected criteria may be diverted from an inbox and displayed instantly to the user in their entirety such that the user can choose to attend to these email messages immediately if he or she so chooses.

As used in the present specification and appended claims, the term "email message" refers broadly to any text, file, or other data sent electronically to a recipient address from a source address using a standardized mail protocol (e.g., Simple Mail Transfer Protocol (SMTP)). Thus, an email message as defined herein may include, but is not limited to, simple text messages, formatted text messages, text messages with files attached thereto, interactive calendar event invitations, interactive task assignments, and the like.

As used in the present specification and appended claims, the term "render" or "rendering" when used in the context of email messages refers to the delivery of an email message to a human user through a user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, an illustrative system (100) of email communication is shown. The system (100) includes a computing device (105) in communication with an email server (110) through a network (115).

The computing device (105) may include a processor (120) communicatively coupled to memory (125) and input/output interfaces (130). The processor (120) may include one or multiple processor cores as may best suit a particular application of the principles described herein. The processor (120) may be configured to read executable code from the memory (125) and execute the code.

The memory (125) may include volatile and/or nonvolatile system memory, such as, but not limited to, random access memory (RAM), read only memory (ROM), Flash memory, and the like. The memory (125) may also include memory from storage devices coupled to the processor (120) as internal components and/or peripheral devices. These storage devices may include, but are not limited to, magnetic storage devices (e.g., hard disk drives, backup tapes, etc.), optical storage devices (CD-ROM, DVD-ROM, CD-RW, DVD-RW, etc.) and solid state drives. The memory (125) may store executable code corresponding to an operating system (135) that manages the operations of the computing device (105) and provides a platform for other software programs, including an email client application (140) to be executed by the processor (120).

The input/output interfaces (130) of the computing device (105) may include hardware and any corresponding firmware or software for providing an interface for devices external to the computing device (105) to provide data to and receive data from the processor (120). For example, a network interface (145) may include a hardware network adapter (also known as a network interface controller (NIC) or network card) configured to create both a hardware and a data bridge between the processor (120) and the network (115). Likewise, peripheral device interfaces (150) may provide hardware and firmware/software to connect peripheral devices to the processor (120). These peripheral devices may include user interface devices (155) that enable a user (160) to communicate with the computing device (105), such as a display device (165) (e.g., monitor, projector, etc.) and one or more input devices (170) (e.g., keyboard, pointer device, touchscreen, microphone, etc.).

The network (115) may facilitate communication between the computing device (105) and the email server (110). In certain embodiments, the network (115) may include a local area network (LAN), such as, but not limited to, a corporate intranet. Additionally or alternatively, the network (115) may include a wide area network (WAN) such as, but not limited to, the Internet.

The email server (110) may be any email server known in the art that may best suit a particular application of the principles herein. The email server (110) may be configured to receive outgoing email messages (175) from the computing device (105) and forward the outgoing email messages (175) to their intended destinations. The email server (110) may also be configured to receive incoming email messages (180, 180-1) from other devices and deliver the incoming email messages (180, 180-1) to the computing device (105). Alternatively, separate email servers may be used to receive outgoing email messages (175) from the computing device (105) and deliver incoming email messages (180, 180-1) to the computing device (105), respectively.

The user (160) may interact with the email client application (140) of the computing device (105) to send and receive email messages (175, 180, 180-1) as described above. As shown in FIG. 1, the user (160) may at times receive a substantial volume of email messages (180, 180-1). These received email messages (180, 180-1) may vary in importance according to the priorities of the user (160). For example, a small subset (180-1) of the email messages (180, 180-1) received may merit immediate action on the part of the user (160) (e.g., reading, responding to, and/or deleting the messages), while viewing the remainder of the email messages (180, 180-1) may be postponed.

Figure 2:
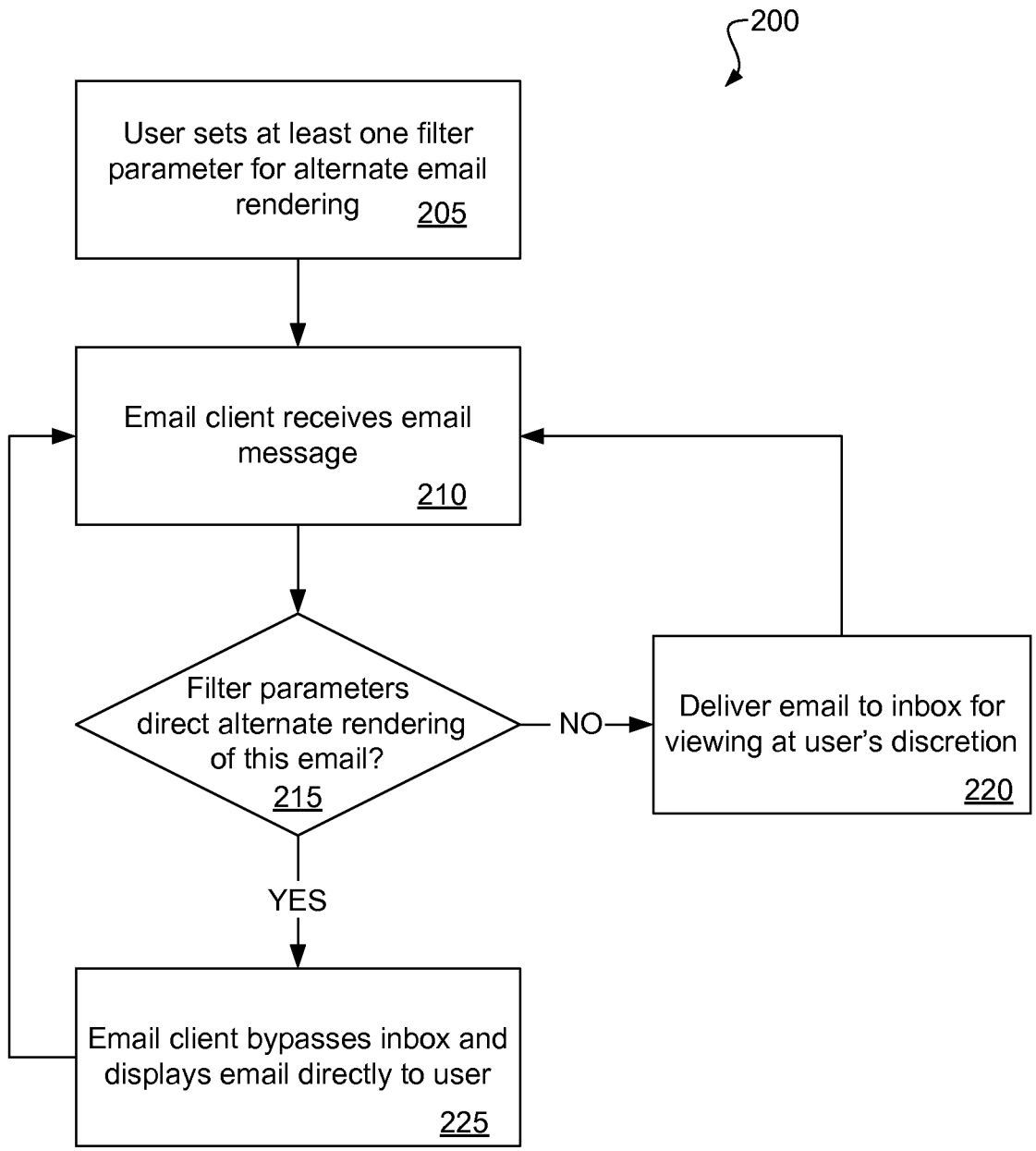
FIG. 2 is a flow diagram of an illustrative method of alternate email rendering, according to one exemplary embodiment of principles described herein.

With reference now to FIG. 2, a flow diagram is shown of an illustrative method (200) of rendering email messages. The method (200) may be performed by, for example, the computing device (105, FIG. 1) illustrated in FIG. 1. The method (200) may provide a means for filtering email messages received in a networked computing device (105, FIG. 1) according to user-specified criteria. Received email messages meeting the filter criteria may undergo an alternative rendering to increase the likelihood that the user will receive and view the email messages in a timely manner.

The method (200) may begin by the user setting (step 205) at least one filter parameter for alternate email rendering. The filter parameter(s) may include, but are not limited to, a minimum email message length, a maximum email message length, a level of urgency associated with the email message, an identity of at least one sender of the email message, an identity of at least one recipient of the email message, and a presence of one or more words or a specified string of characters or words in a specified field of the email message. The one or more filter parameters may be received in the networked computing device (105, FIG. 1) through a user interface (155, FIG. 1) that allows the user to interact directly with the computing device (105, FIG. 1). Once received in the computing device (105, FIG. 1), the filter parameter(s) may be stored in memory by the computing device (105, FIG. 1) for later reference.

After the one or more filter parameters have been set (step 205) by the user, an email client application (140, FIG. 1) implemented by the computing device (105, FIG. 1) storing the parameter(s) may receive (step 210) an email message over a network (115, FIG. 1). For example, the email client (105, FIG. 1) may check an email server (110, FIG. 1) for new messages on the email client (105, FIG. 1) directed to an email account managed by the email client (105, FIG. 1) and subject to the one or more filter parameters. Upon determining that one or more such email messages are present on the email server (110, FIG. 1), the email client application (140, FIG. 1) may initiate a download of the email message(s) from the email server (110, FIG. 1) to the computing device (105, FIG. 1).

Once the email message(s) have been received by email client application (140, FIG. 1) of the computing device (105, FIG. 1), each email message may be evaluated (decision 215) to determine whether the one or more filter parameters set (step 205) by the user direct an alternate rendering of the email message. For example, if the user-selected filter parameter included a maximum length such that email messages shorter than the maximum length were to alternately rendered, the email client application (140, FIG. 1) would determine if the received email message had a length shorter than the maximum length specified by the user.

If an evaluation of the email message in light of the user-selected filter parameters indicates (decision 215, NO) that the filter parameters do not direct an alternate rendering of this email message, the email client application (140, FIG. 1) will deliver (step 220) the email message to a normal inbox for viewing at the user's discretion. In certain embodiments, upon delivery to the inbox the email message may undergo additional filtering to direct the email message to a folder within the inbox, to a trash folder, or to allow the email message to remain in the inbox.

If an evaluation of the email message in light of the user-selected filter parameters indicates (decision 215, YES) that the filter parameters direct an alternate rendering of this email message, the email client application (140, FIG. 1) will bypass a normal inbox and provide an immediate display (step 225) of the email to the user. The immediate display may include, for example, a popup window on a visual display device (165, FIG. 1) of the computing device (105, FIG. 1). Additionally or alternatively, the immediate display may occur in a designated area of a user display. For example, the immediate display may occur in a designated pane or sidebar of the user display. Nevertheless, any process of bypassing a normal inbox and immediately displaying the email message to the user that suits a particular application of the principles described herein is encompassed and anticipated by the present specification.

In some situations, a plurality of unread email messages may be received that qualify for alternate rendering and immediate display to the user prior within a short period of time or during a period of time in which the user chooses not to view even the alternately rendered emails. Thus, in certain embodiments the immediate display shown to the user may include displaying a plurality of unread email messages filtered for immediate display to the user.

Additionally or alternatively, a user may desire to perform an action in response to viewing an email message immediately displayed according to the present method (200). For example, the user may desire to reply to the email message, forward the email message, delete the email message, and/or relegate the email message to the normal inbox. As such, the immediate display of an email may include inherent functionality that allows the user to perform one or more such actions. Additionally or alternatively, an immediately displayed email message may include one or more interactive components, such as "accept" and "decline" options for an interactive calendar event invitation. Accordingly, the immediate display of such an email may include inherent functionality that preserves the interactive nature of the email message, allowing the user to interact directly with the email message in the interactive display. Thus, returning to the example of the interactive calendar invitation email message, an immediate display of the email may provide "accept" and "decline" buttons, in addition to any other buttons or other functional components used to implement the interactive functionality of the email message. Hence, if a user clicks on an "accept" button in an interactive calendar event invitation email message in an immediate display, the email client application (140, FIG. 1) may reply with an "accept" response to the email sender and add the event to a user's calendar application.

After a decision has been made regarding the delivery of an email message received by the email client application (140, FIG. 1), flow will return to block 210 for each additional email message received by the email client application (140, FIG. 1) using the at least one filter parameter already set (step 205) by the user. The method (200) may also be reinitiated at block 205 by the user choosing to modify or update the at least one filter parameter for alternate email rendering.

Figure 3:
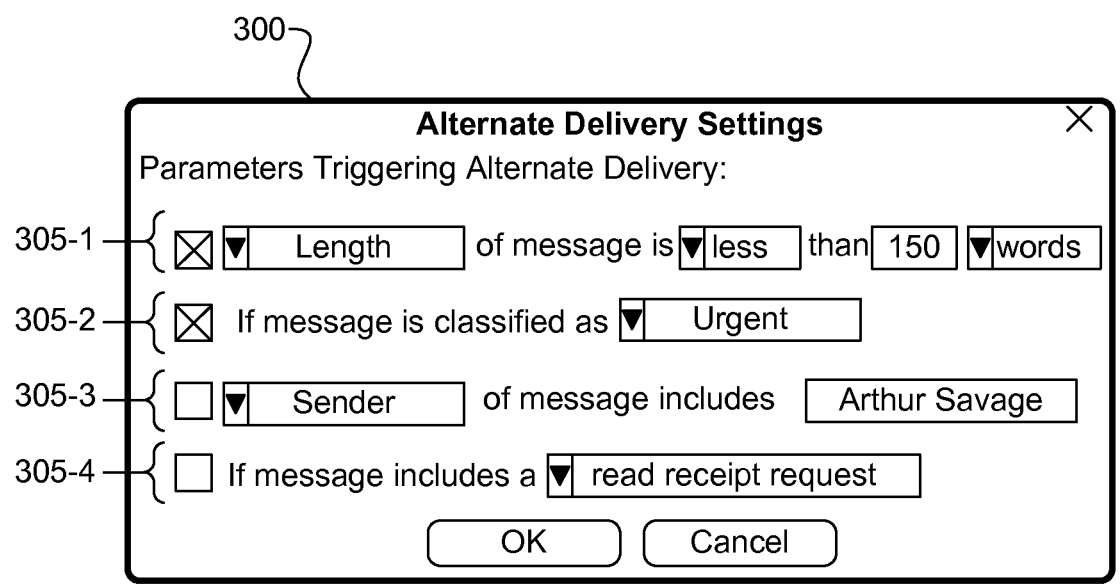
FIG. 3 is a diagram of an illustrative email client user display for selecting at least one filter criterion, according to one exemplary embodiment of principles described herein.

With reference now to FIG. 3, a diagram is shown of an illustrative user interface window (300) for setting alternate email rendering filter parameters as described above. The user interface window (300) may be displayed to a user by an email client application (140, FIG. 1) running on a computing device (105, FIG. 1). The illustrative user interface window (300) of the present example includes a plurality of filter parameters (305-1 to 305-4) that may be set by the user and selectively enabled (e.g., using the checkboxes). In alternate embodiments, a single filter parameter or any other number of filter parameters may be configurable by a user according to a particular application of the principles of the present specification.

As shown in FIG. 3, a plurality of filter parameters may be specified at once and selectively enabled. When two or more filter parameters are concurrently enabled, both parameters may be evaluated using a logical OR such that either parameter may trigger an alternate rendering (i.e., bypass of normal inbox and immediate display) of the email message. In alternative embodiments, both parameters may be evaluated using a logical AND such that all enabled parameters must be met to trigger alternate rendering of the email message. In still other embodiments, a user may select whether some or all enabled parameters will be evaluated using a logical OR or a logical AND.

In the present example, a first parameter (305-1) is directed to a numerical threshold value. Dropdown menus and fields allow the user to configure the numerical threshold. Thus, the first parameter (305-1) is configured in the present example to trigger alternate delivery/rendering of an email message if the length of the message is less than 150 words. As shown in FIG. 3, the fields for "length," "less," and "words" may be changed using dropdown menus and the value 150 may be modified by entering a different value into its corresponding field.

A second parameter (305-2) in the present example is directed to a classification of the received email message. As configured in FIG. 3, the second parameter (305-2) will trigger alternate rendering of the email message if the message is classified as urgent by the sender. This classification trigger may be updated using the dropdown menu in the second parameter (305-2).

A third parameter (305-3) in the present example is directed to the presence of a string of characters in a specified field of the email message. As configured in FIG. 3, the third parameter would trigger alternate rendering (if the parameter were enabled) of the email message if the sender field of the message includes the string "Arthur Savage." The specified field of the email message and the string of characters may be updated using the dropdown menu and editable field of the third parameter, respectively.

A fourth parameter (305-4) of the present example is directed to the presence of a feature associated with the email message, such as an attachment or a read receipt request. As configured in FIG. 3, the fourth parameter would trigger alternate rendering (if the parameter were enabled) of the email message if the email message includes a read receipt request.

It will be understood that the configurable filter parameters (305-1 to 305-4) shown in the illustrative user interface window (300) are merely a small subset of the filter parameters that may be specified by a user to trigger alternate email rendering. As described previously, any user-specified filter parameter may be used to trigger alternate email rendering suitable to a particular application of the principles described herein. Additional exemplary user-specified filter parameters that may be applied to the principles described herein may include, but are not limited to, a specific type of email message (e.g., normal email, interactive calendar event invitation, an email message assigning an interactive task to the recipient, etc.) and a feature of a specific type of email message (e.g., the date/time of a proposed calendar event, the priority level of an interactive task, etc.).

Figure 4:
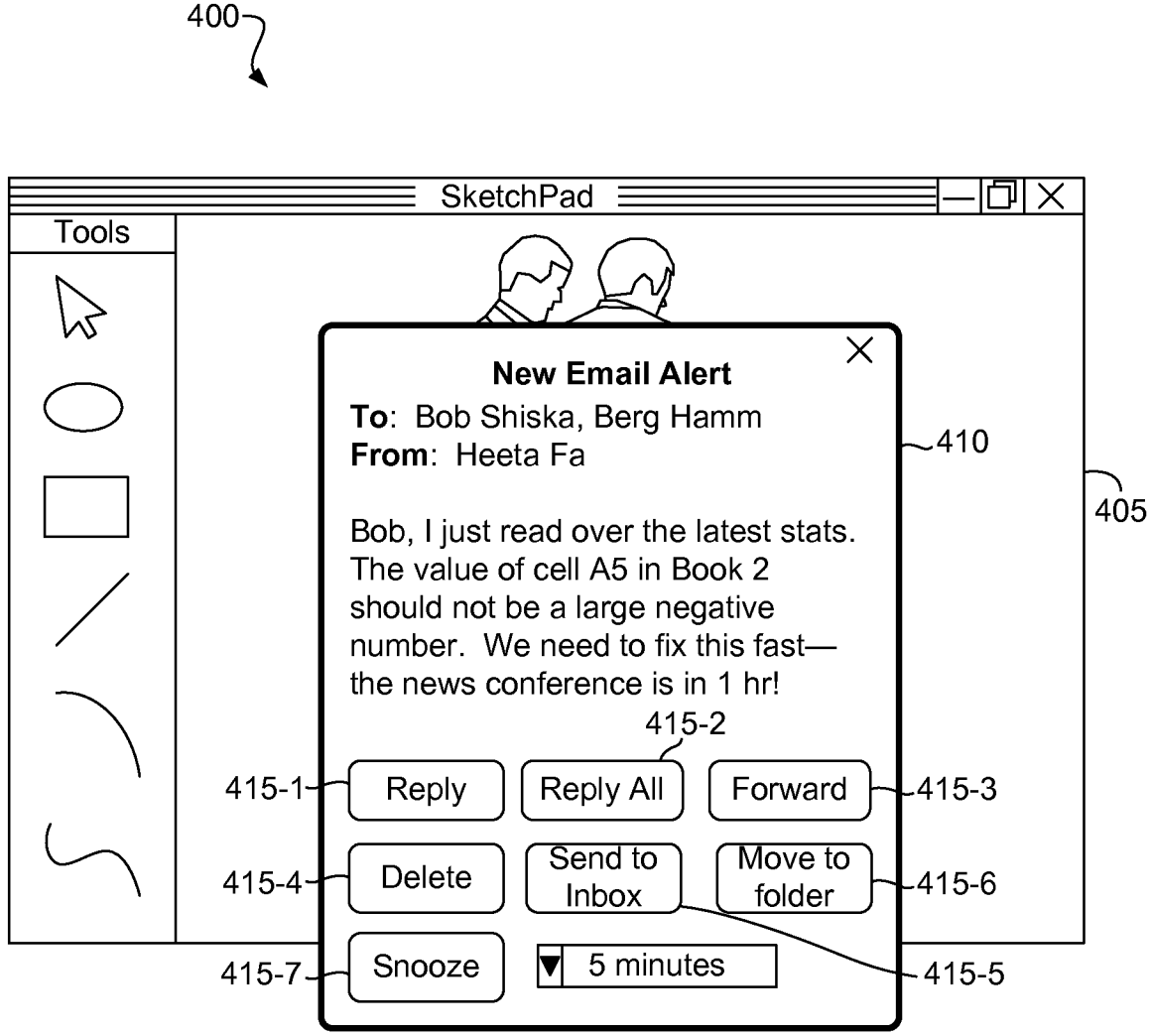
FIG. 4 is a diagram of an illustrative email rendering by an email client, according to one exemplary embodiment of principles described herein.

With reference now to FIG. 4, a portion of an illustrative user display (400) is shown that includes an illustrative email rendering according to the principles described above. The user display (400) includes an active application (405) that may be occupying the attention of the user. A popup display window (410) may appear above the active application (405) and draw the user's attention away from the active application (405). It will be understood that an active application (405) need not be running on the computing device (105, FIG. 1) to accomplish the alternate email rendering taught in the present specification. The presence of an active application (405) in FIG. 4 merely illustrates one of the advantages of the methods and systems of the present specification—that of immediately displaying email messages that fit certain user-selected criteria to a user even when the user is not actively using the email client application (140, FIG. 1).

The popup display window (410) may be used to immediate display an email message meeting one or more user-specified filter parameters according to the method (200, FIG. 2) described in relation to FIG. 2. As such, the popup display window (410) may display the entire text of the email message in addition to buttons (415-1 to 415-7) that allow the user to take specific actions with respect to the email message.

In the present example, these buttons (415-1 to 415-7) include a reply button (415-1) that allows the user to immediately reply to the sender of the email message, a "reply all" button (415-2) that allows the user to immediately reply to the sender and all recipients of the email message, a forward button (415-3) that allows the user to forward the email message to additional recipients, a delete button (415-4) that allows the user to delete the email message, a "send to inbox" (415-5) button that allows the user to relegate the email message to the normal inbox of the email client application (140, FIG. 1), a "move to folder" button (415-6) that allows the user to move the email message to a specific storage folder, and a snooze button (415-7) that allows the user to postpone viewing the email message (410) for a specified period of time. It will be understood that additional and/or different buttons may be included in a popup display window or other immediate display of an email message consistent with the principles described herein.

Figure 5:
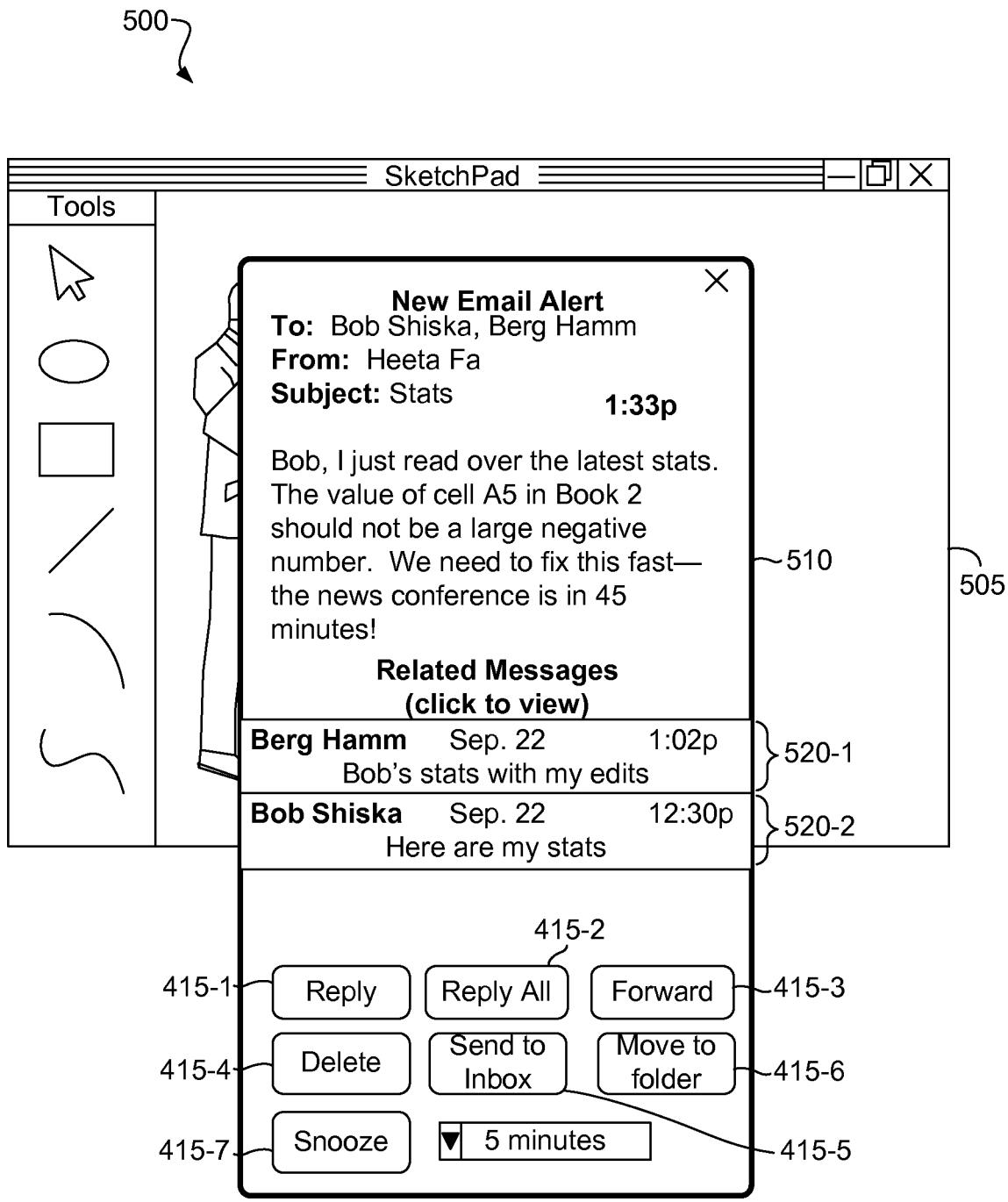
FIG. 5 is a diagram of an illustrative email rendering by an email client, according to one exemplary embodiment of principles described herein.

With reference now to FIG. 5, a portion of an illustrative user display (500) is shown that includes another illustrative email rendering according to the principles described above. The user display (500) includes an active application (505)

and a popup display window (510) that appears above the active application (505). The popup display window (510) of the present example not only shows the entire text of the received email, but also previously received or sent email messages (520-1, 520-2) that are related to the received email (e.g., having the same or similar subject line and/or parties). The popup display window (510) of the present example also includes the functional buttons (415-1 to 415-7) described with reference to FIG. 4.

Figure 6:
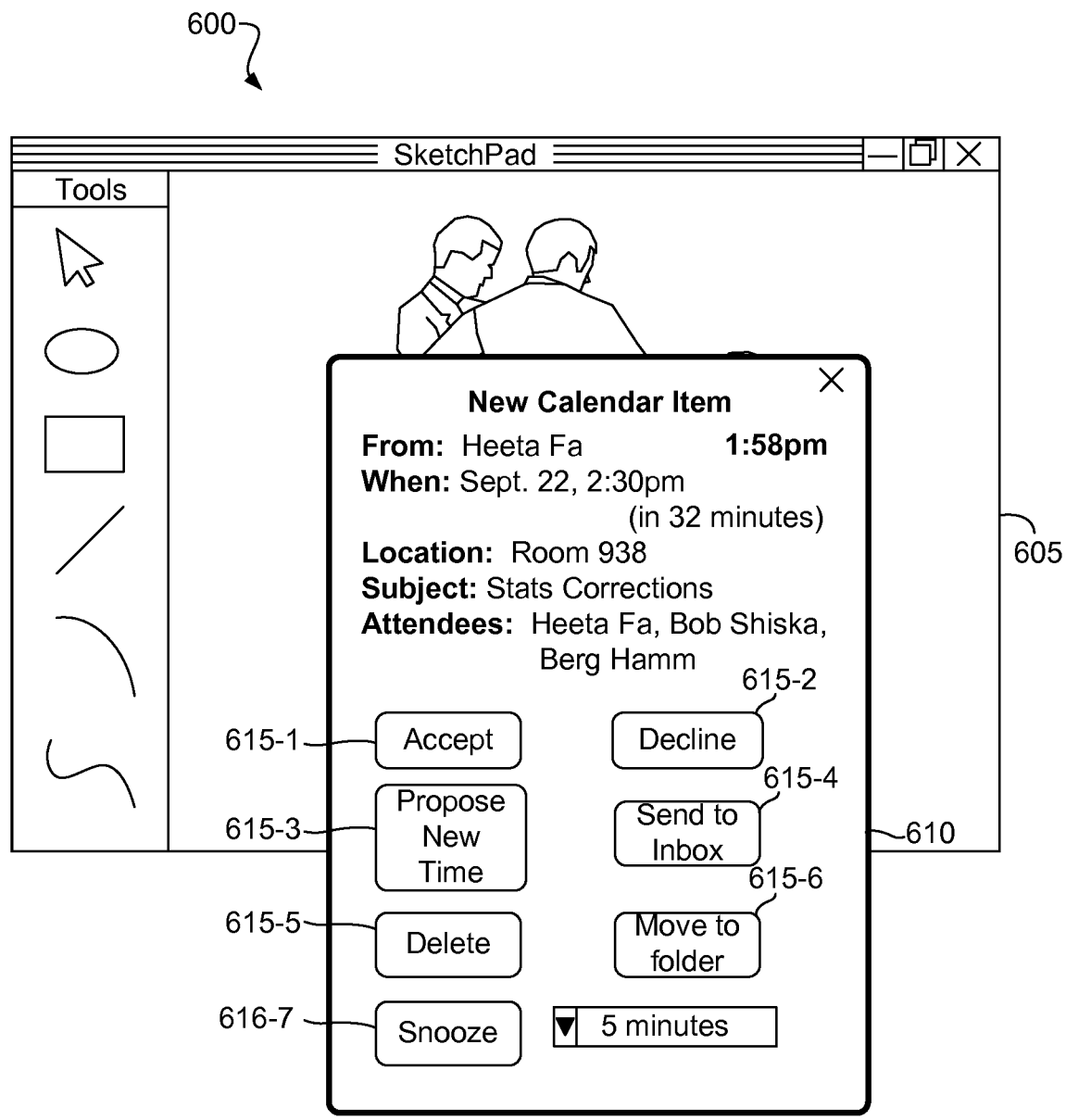
FIG. 6 is a diagram of an illustrative email rendering by an email client, according to one exemplary embodiment of principles described herein.

With reference now to FIG. 6, a portion of an illustrative user display (600) is shown that includes another illustrative email rendering according to the principles described above. The user display (600) includes an active application (605) and a popup display window (610) that appears above the active application (605). In the present example, the email message shown by the popup display window (610) is an interactive email calendar event invitation. Accordingly, the popup display window (610) includes various buttons (615-1 to 615-7) that implement a desired functionality with respect to the emailed interactive calendar event invitation. An "accept" button (615-1) allows the user to reply automatically to the sender with an acceptance to the event and may also automatically add the event to a calendar managed by the email client application (140, FIG. 1). A "decline" button (615-2) allows the user to reply automatically to the sender with a declination of the event. A "propose new time" button (615-3) allows the user to reply to the sender with a declination of the event at the originally proposed time/date with a proposal for a different time/date. The "send to inbox" button (615-4), delete button (615-5), "move to folder" button (615-6), and snooze button (615-7) may maintain the same functionality as their counterparts described with reference to FIG. 4.

Figure 7:
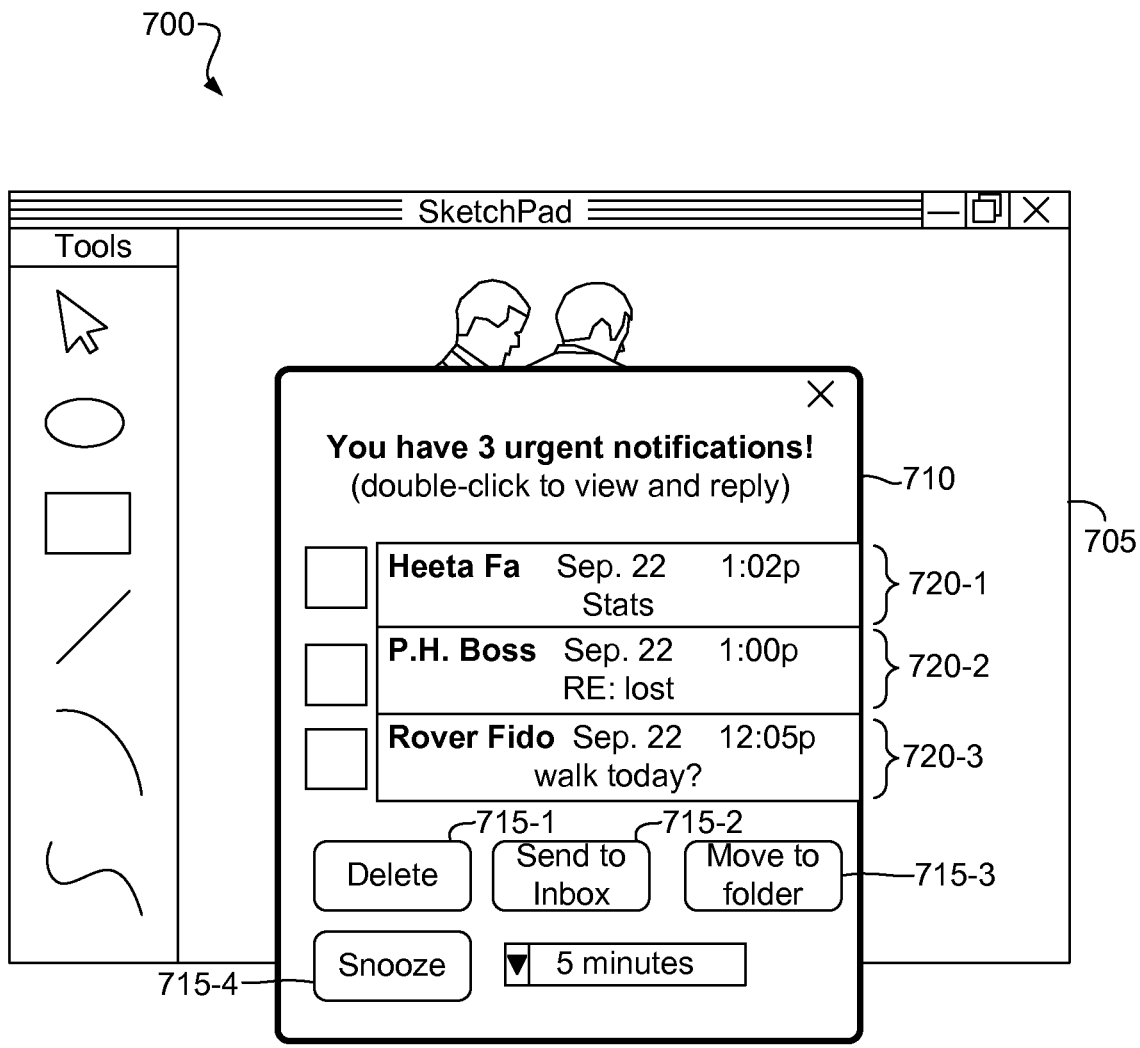
FIG. 7 is a diagram of an illustrative email rendering by an email client, according to one exemplary embodiment of principles described herein.

With reference now to FIG. 7, a portion of an illustrative user display (700) is shown that includes another illustrative email rendering according to the principles described above. The user display (700) includes an active application (705) and a popup display window (710) that appears above the active application (705). As described above, in certain situations, multiple email messages meeting the filter criteria for alternate rendering will be received by an email client application (140, FIG. 1) before a user is able to address any of them. As such, the popup display window (710) of the present example displays a plurality of email messages (720-1, 720-2, 720-3), allowing the user to selectively view the email messages (720-1, 720-2, 720-3) from the popup display window (710). The email messages (720-1, 720-2, 720-3) may be selected individually or in plural and either deleted, relegated to a normal inbox, or moved to a specific folder using buttons (715-1, 715-2, 715-3, respectively). The popup display window (710) may also include a snooze button (715-4).

Figure 8:
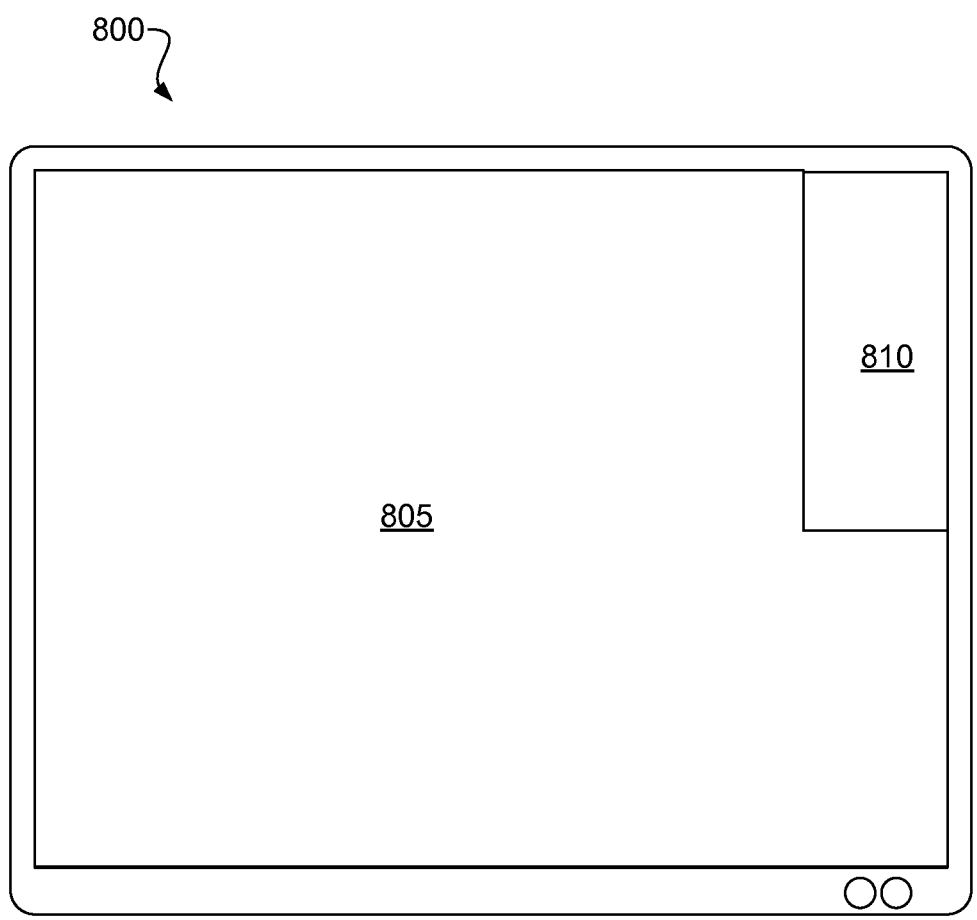
FIG. 8 is a diagram of an illustrative screen layout of a visual display device, according to one exemplary embodiment of principles described herein.

With reference now to FIG. 8, a user display device (800) is shown. The user display device (800) may be configured to display a user interface having a general screen area (805) dedicated to various normal operations of the computing device (105, FIG. 1). Additionally, the user interface may include sidebar screen area (810) dedicated to the immediate display of email messages fitting certain user-selected filter criteria as described above. This sidebar screen area (810) may be used as an alternative to or in addition to the popup display windows (410, 510, 610, 710) described in previous embodiments. The sidebar screen area (810) may display any of the elements described with reference to FIGS. 4-7 in any combination.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of rendering email, comprising:
receiving an email message addressed to a particular user with an email client application on a networked computing device operated by that particular user;
applying at least one filter criterion to content of said email message;
responsive to a determination by said networked computing device that said email message meets said at least one filter criterion, diverting said email message from delivery to an inbox of the email client application of said particular user and providing an alternative rendering of said email message on a display device of the networked computing device for attention by said particular user; and responsive to input from said particular user through said alternative rendering, processing said email message; and responsive to the email message being sent to the inbox, re-filtering the email message;

wherein the email message comprises an interactive calendar event invitation and said alternative rendering comprises user input options for accepting or declining said calendar event invitation.

2. The method of claim 1, wherein said at least one filter criterion is configured by a user operating said networked computing device and an email client application of that networked computing device.

3. The method of claim 1, wherein said at least one filter criterion comprises at least one of: a minimum length of said email message, and a maximum length of said email message.

4. The method of claim 1, wherein said alternative rendering comprises a popup window on a visual display device of said computing device.

5. The method of claim 4, further comprising providing a display of a plurality of unread email messages that meet said at least one filter criterion to said user in a single popup window.

6. The method of claim 1, wherein said alternative rendering of said email message comprises user input options to reply to said email message; forward said email message; and send said email message on to a specific folder in the inbox.

7. The method of claim 1, said alternative rendering comprising a user input options to snooze said alternative rendering of said email message.

8. The method of claim 1, wherein said email message comprises an interactive calendar event invitation and said alternative rendering comprises user input options for accepting or declining said calendar event invitation.

9. The method of claim 1, further comprising responsive to a determination that said email message does not meet said at least one filter criterion, automatically sending said email message to said inbox.

10. A computing device configured to implement an email client application, the computing device comprising:
a display device;
a processor with associated memory; and
a network interface with which to receive an email message addressed to a particular user associated with that computing device and email client application;
wherein said computing device is configured to divert the email message received from an email server over a network through the network interface from delivery to an inbox of the email client application and provide an alternative rendering of said email message on the display device for notification of the user responsive to said computing device determining that said email message meets at least one criterion for alternative email rendering;
wherein said alternative rendering of said email message comprises user input options to reply to said email message forward said email message and send said email message on to the inbox, and
wherein diverting the email message received from the email server comprises bypassing the inbox and immediately displaying the email message on the display device, and
wherein said email message comprises an interactive calendar event invitation and said alternative rendering comprises user input options for accepting or declining said calendar event invitation; and
wherein said computing device is further configured to, responsive to the email message being sent to the inbox, re-filter the email message.

11. The computing device of claim 10, wherein said at least one filter criterion comprises at least one of: a minimum length of said email message, a maximum length of said email message, and a level of urgency associated with said email message.

12. The computing device of claim 10, wherein said alternative rendering comprises a popup window on said display device of said computing device.

13. The computing device of claim 10, wherein said alternative rendering comprises a plurality of unread email messages that meet said at least one filter criterion to said user in a single display window on said display device.

14. The computing device of claim 10, wherein said alternative rendering of said email message further comprises an option for said user to snooze said alternative rendering of said email message to be re-presented after a period of time.

15. The computing device of claim 10, wherein said alternative rendering of said email message further comprises an option for said user to send said email message to a designated folder.

16. The computing device of claim 10, wherein said computing device is further configured to, responsive to a determination that said email message does not meet said at least one filter criterion, automatically send said email message to said inbox.

17. A computer program product for email rendering, the computer program product comprising:
a non-transitory computer readable storage medium having computer readable program code embodied therewith, the computer readable program code to, when executed by a processor:
receive an email message addressed to a particular user with an email client application on a networked computing device operated by that particular user,
apply at least one filter criterion to content of said email message;
responsive to a determination by said networked computing device that said email message meets said at least one filter criterion, divert said email message from delivery to an inbox of the email client application of said particular user and providing an alternative rendering of said email message on a display device of the networked computing device for attention by said particular user; and
responsive to input from said particular user through said alternative rendering, process said email message; and
responsive to the email message being sent to the inbox, re-filtering the email message; and
wherein the email message comprises an interactive calendar event invitation and said alternative rendering comprises user input options for accepting or declining said calendar event invitation.

18. The computer program product of claim 17, wherein said at least one filter criterion comprises at least one of: a minimum length of said email message, a maximum length of said email message, and a level of urgency associated with said email message.

19. The method of claim 1, wherein the alternative rendering is rendered in a designated pane of a user display separated from a general screen area dedicated to other operations of the computing device.

20. The method of claim 1, wherein diverting the email message from delivery to the inbox comprises bypassing the inbox and immediately displaying the email message on a visual display device.

\* \* \* \* \*